(12) United States Patent
Gebhard et al.

(10) Patent No.: US 10,557,208 B2
(45) Date of Patent: Feb. 11, 2020

(54) METHOD OF PRODUCING REINFORCED CONTAINER

(71) Applicant: Rolls-Royce Corporation, Indianapolis, IN (US)

(72) Inventors: John Gebhard, Fishers, IN (US); Doug Schetzel, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 122 days.

(21) Appl. No.: 15/873,555

(22) Filed: Jan. 17, 2018

(65) Prior Publication Data

US 2019/0218679 A1 Jul. 18, 2019

(51) Int. Cl.
| | |
|---|---|
| C25D 1/00 | (2006.01) |
| C25D 1/10 | (2006.01) |
| B29C 41/40 | (2006.01) |
| B29C 41/20 | (2006.01) |
| B29C 64/10 | (2017.01) |
| B33Y 40/00 | (2015.01) |
| B33Y 80/00 | (2015.01) |
| C25D 5/54 | (2006.01) |
| B22D 29/00 | (2006.01) |

(52) U.S. Cl.
CPC .......... *C25D 1/003* (2013.01); *B22D 29/003* (2013.01); *B29C 41/20* (2013.01); *B29C 41/40* (2013.01); *B29C 64/10* (2017.08); *C25D 1/10* (2013.01); *C25D 5/54* (2013.01); *B33Y 40/00* (2014.12); *B33Y 80/00* (2014.12)

(58) Field of Classification Search
CPC .......... C25D 1/003; C25D 1/10; B29C 64/10; B29C 64/106; B29C 41/20; B29C 41/40; B22D 29/003; B33Y 80/00
See application file for complete search history.

(56) References Cited

U.S. PATENT DOCUMENTS

| | | | |
|---|---|---|---|
| 2008/0145639 A1* | 6/2008 | Sun | A61L 27/56 |
| | | | 428/304.4 |
| 2017/0072466 A1* | 3/2017 | Zehavi | B29C 64/40 |

* cited by examiner

*Primary Examiner* — Jermie E Cozart
(74) *Attorney, Agent, or Firm* — Mccracken & Gillen LLC

(57) ABSTRACT

A container structure having one or more sections and a method for manufacturing such a structure is provided. Using an additive manufacturing process, a mold material is applied to produce a shaped substrate in the form of the desired sections and/or structure. Multiple reinforcement members are disposed within the substrate and extend between and are at least partially exposed at the inner and outer substrate surfaces. A coating material is applied to the inner and outer substrate surfaces and bonds to the exposed portions of the reinforcement members. The mold material is removed and replaced with another material among the reinforcement members between the substrate coatings.

15 Claims, 5 Drawing Sheets

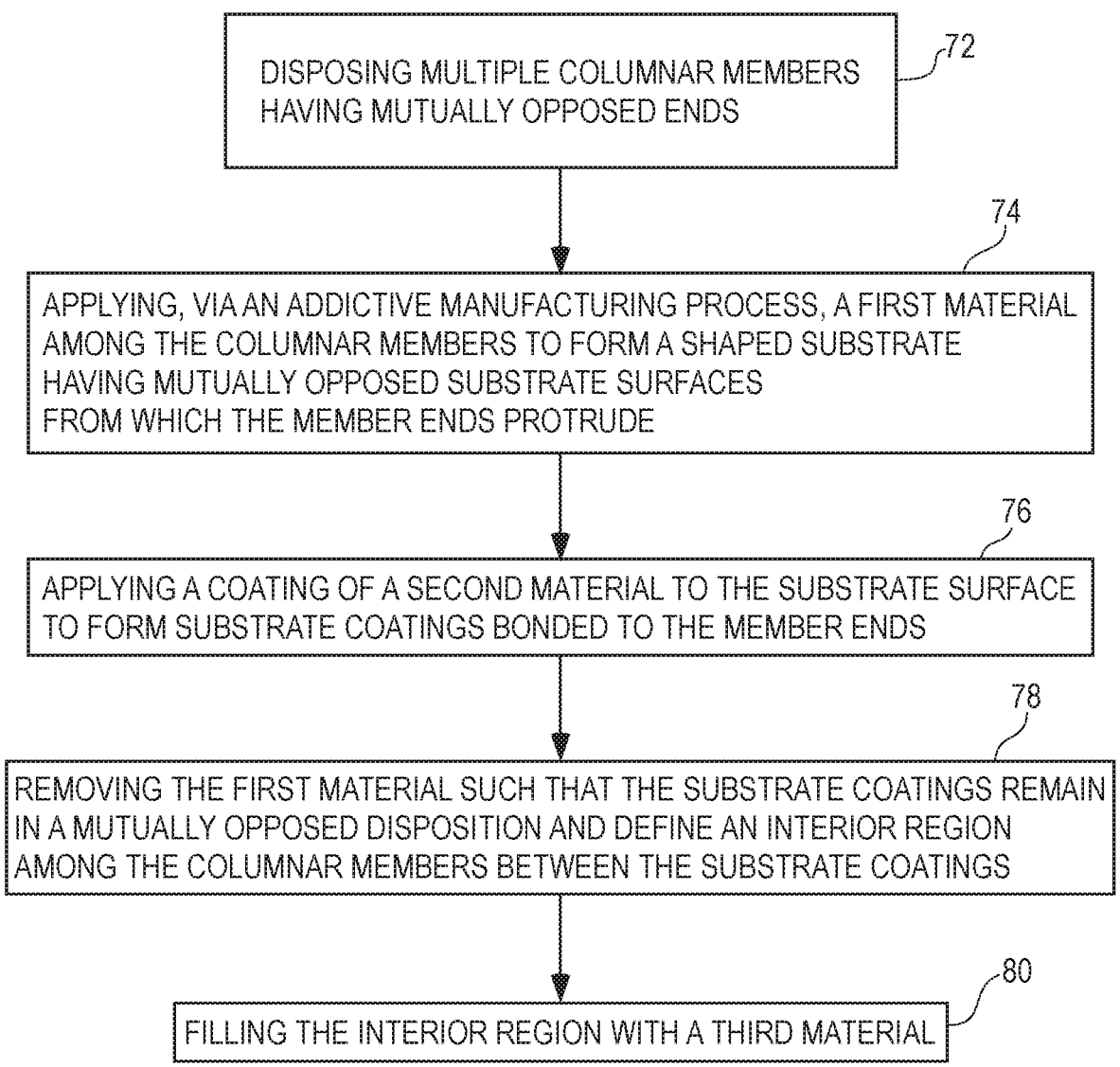

METHOD OF PRODUCING REINFORCED CONTAINER

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

FIELD OF DISCLOSURE

The present subject matter relates to fluid containers, and more particularly, to manufacturing containers reinforced for structural rigidity while reducing weight.

BACKGROUND

In the aircraft industry, fluid containers, such as oil tanks, for the engine systems are increasingly required to have complex shapes while also being lightweight. Typical approaches for oil tank structures today include using welded sheet metal structures, metal castings or a hybrid of both combined. However, as the scale of the tanks grow for larger engines and the required geometries for packaging the tanks become more creative, there is an increasing need for new design techniques.

Typical construction materials have included aluminum, which is lightweight, and thin-walled stainless steel, which can still offer lower weight along with greater strength. However, costs for tooling and manufacturing steps needed when working with such materials increase dramatically as the needed shapes become more complex. Composite materials have been tried and while they may offer advantages over metals for achieving more complex shapes, fire resilience of composites is poor.

Accordingly, there is a need for an improved design technique for fluid containers offering both high structural strength and fire resilience.

SUMMARY

A container structure having one or more sections and a method for manufacturing such a structure is provided. Using an additive manufacturing process, a mold material is applied to produce a shaped substrate in the form of the desired sections and/or structure. Multiple reinforcement members are disposed within the substrate and extend between and are at least partially exposed at the inner and outer substrate surfaces. A coating material is applied to the inner and outer substrate surfaces and bonds to the exposed portions of the reinforcement members. The mold material is removed and replaced with another material among the reinforcement members between the substrate coatings.

In accordance with an exemplary embodiment, a method for manufacturing at least a portion of a reinforced container includes: forming, with a first material via an additive manufacturing process, a shaped substrate having mutually opposed first and second substrate surfaces; disposing, within the substrate, a plurality of transverse members each of which includes mutually opposed first and second member ends exposed at least partially at the first and second substrate surfaces, respectively; applying a coating of a second material to the first and second substrate surfaces to form first and second substrate coatings bonded to the first and second member ends, respectively; removing substantially all of the first material such that the first and second substrate coatings remain in a mutually opposed disposition and define an interior region among the plurality of transverse members between the first and second substrate coatings; and filling substantially all of the interior region with a third material.

In accordance with another exemplary embodiment, a method for manufacturing at least a portion of a reinforced container includes: disposing a plurality of columnar members each of which includes mutually opposed first and second member ends; applying, via an additive manufacturing process, a first material among the plurality of columnar members to form a shaped substrate having mutually opposed first and second substrate surfaces at which the first and second member ends, respectively, are exposed at least partially; applying a coating of a second material to the first and second substrate surfaces to form first and second substrate coatings bonded to the first and second member ends, respectively; removing substantially all of the first material such that the first and second substrate coatings remain in a mutually opposed disposition and define an interior region among the plurality of columnar members between the first and second substrate coatings; and filling substantially all of the interior region with a third material.

In accordance with another exemplary embodiment, a reinforced container with one or more mutually coupled sections includes: a shaped outer wall defining at least part of an exterior surface of the reinforced container and having a first material density; a shaped inner wall defining at least part of an interior surface of the reinforced container and having a second material density; a plurality of internal members, disposed within an interior region defined by the inner and outer walls, each of which has a third material density and includes mutually opposed first and second member ends bonded to respective locations of the inner and outer walls; and an interior material filling the interior region among the plurality of internal members and having a fourth material density less than each of the first, second and third material densities.

BRIEF DESCRIPTION OF THE DRAWINGS

FIG. 9 depicts a flowchart for a method to produce a container in accordance with exemplary embodiments.

DETAILED DESCRIPTION

The following detailed description is of example embodiments with references to the accompanying drawings. Such description is intended to be illustrative and not limiting. Such embodiments are described in sufficient detail to enable one of ordinary skill in the art to practice the disclosed embodiments, and it will be understood that other embodiments may be practiced with some variations without departing from the spirit or scope of the present disclosure.

As discussed in more detail below, an alternative style of construction is introduced for a lightweight container structure, such as an oil tank. As additive manufacturing ("AM", and also referred to as "3D printing") continues to evolve on increasingly larger scales, creating a near net shape of a desired structure has become more viable, and is very advantageous for structures having complex shapes. In the example discussed below, a mold in the net shape of a 3D printed structure of a desired oil tank can be produced in the form of a printed plastic core in which is embedded a grid of metal pins extending between the inner and outer surfaces. A metal coating is then applied to the inner and outer surfaces and bonds with the exposed ends of the embedded pins. The resulting inner structure of the embedded and bonded pins allows the 3D printed plastic core to be melted and forced out, thereby creating a void between the metal coatings and among the pins. This now hollow core may be filled with another material, such as a fire-resistant foam material, which offers fire resilience and low density. Such foam material may be selected based upon a desired level of fire resilience, and will preferably be initially in a fluid form capable of being pressure filled into the void with no remaining interior voids or air pockets.

Figure 1:
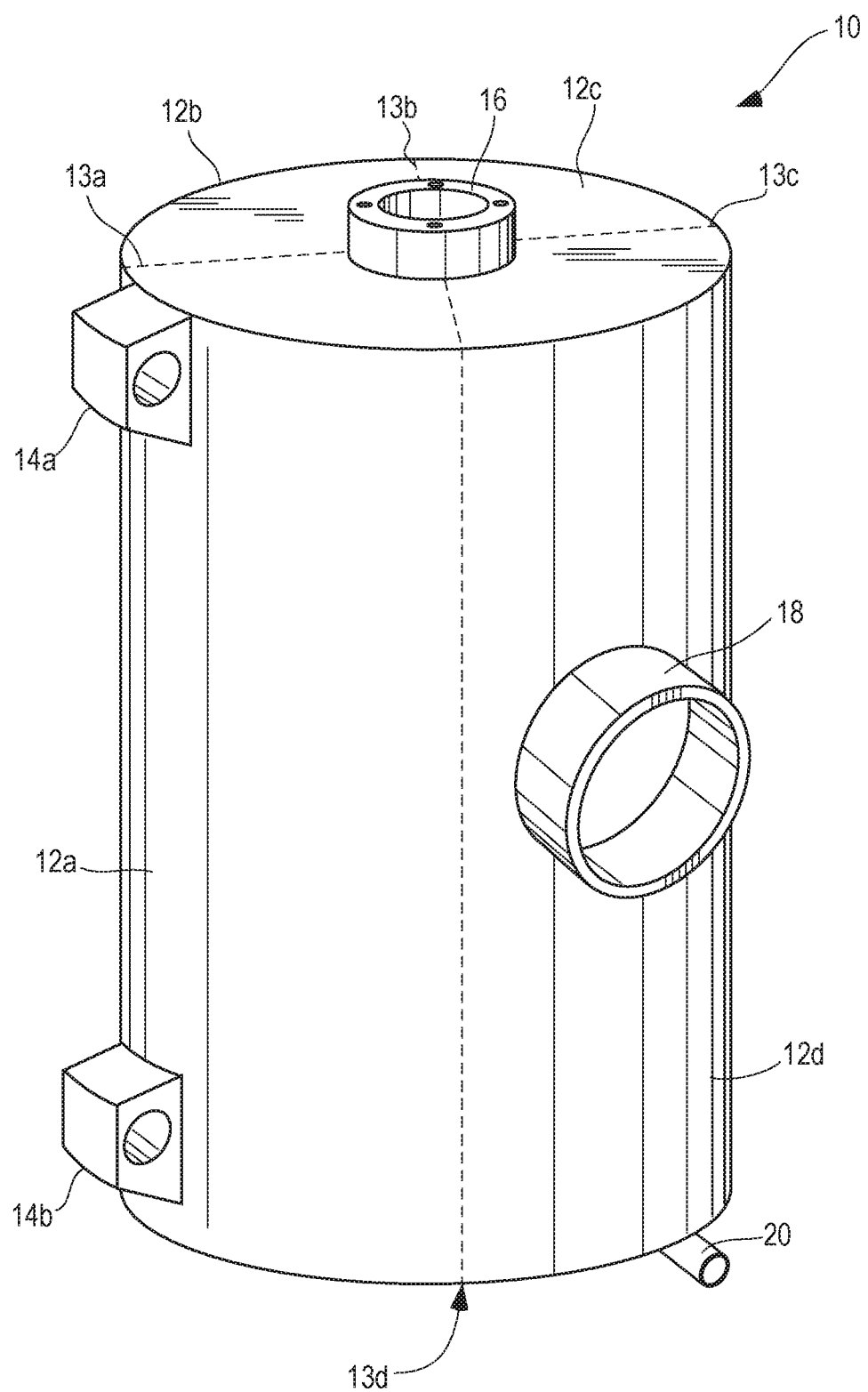
FIG. 1 depicts a completed container produced in accordance with exemplary embodiments.

Referring to FIG. 1, a container 10 produced in accordance with exemplary embodiments may be produced in sections, e.g., four sections 12a, 12b, 12c, 12d that can be produced separately (in accordance with processes discussed in more detail) and later assembled by being joined together via seams or joints 13a, 13b, 13c, 13d to form a single unit. As will be readily appreciated by one of ordinary skill in the art, the joints 13a, 13b, 13c, 13d may be of any type (e.g., tongue and groove, etc.) enabling assembly and securing via an adhesive, seal, gasket and/or mounting hardware as desired. Alternatively, depending upon considerations, such as shape complexities or size of the final container, the container may also be produced in one piece. Also included may be mounting bosses 14a, 14b and various ports (e.g., inlets and/or outlets) 16, 18, 20 for the fluid to be contained.

Figure 2:
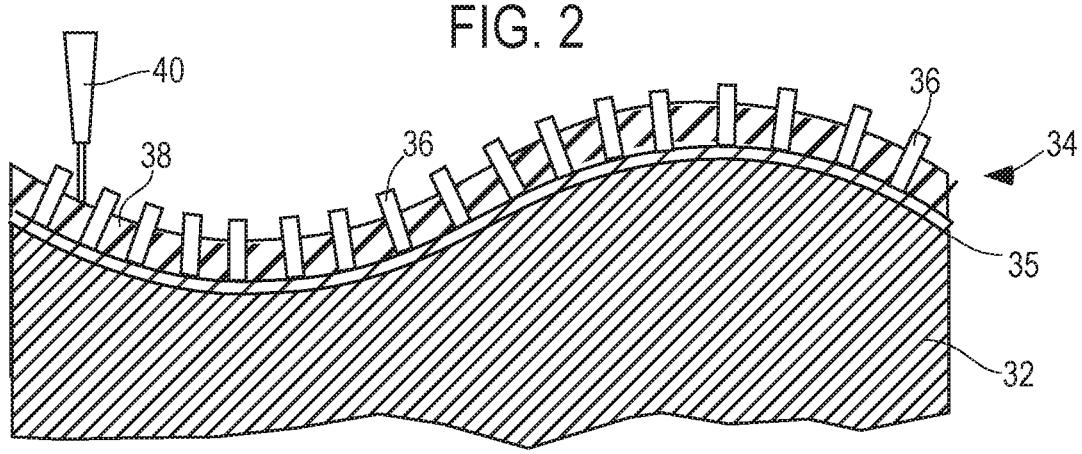
FIG. 2 depicts fabrication of a net shape core for producing a container in accordance with exemplary embodiments.

Referring to FIG. 2, each section 12a, 12b, 12c, 12d may be produced by first providing a base mold or other workpiece having a forming surface 32 to provide the net shape of the section to be produced. A pin assembly 34 including a backing material 35 to which multiple pins 36 are secured (e.g., via an adhesive) is positioned to conform to the forming surface 32. Then, in accordance with well-known additive manufacturing (AM) processes, the mold material 38 is applied with an AM applicator or depositor tool 40 to fill the empty region among the pins 36. Such added material 38 is preferably deposited such that the upper tips of the pins 36 remain exposed for bonding with a coating to be applied later (discussed in more detail below).

As will be readily known by one of ordinary skill in the art, examples of AM processes include (without limitation) stereolithography (SLA), multi jet modeling (MJM), fused deposition modeling (FDM), continuous liquid interface production (CLIP) and selective laser sintering (SLS). Any of these AM processes, or others, may be used for producing a container as discussed herein, depending upon the material desired for the mold.

Alternatively, rather than positioning the pins 36 as a group (e.g., in a pin grid array) on a backing material 35, the pins 36 may be inserted individually into the mold material 34 after its formation and shaping on the forming surface 32. For example, the pins 36 may be pressed into the mold material 34 while it is still in liquid or semi-liquid form before it fully cures, or the cured mold material 34 may be drilled to provide mounting holes into which the pins 36 may be inserted (e.g., with an adhesive to ensure their retention within the mold material 34).

Figure 3:
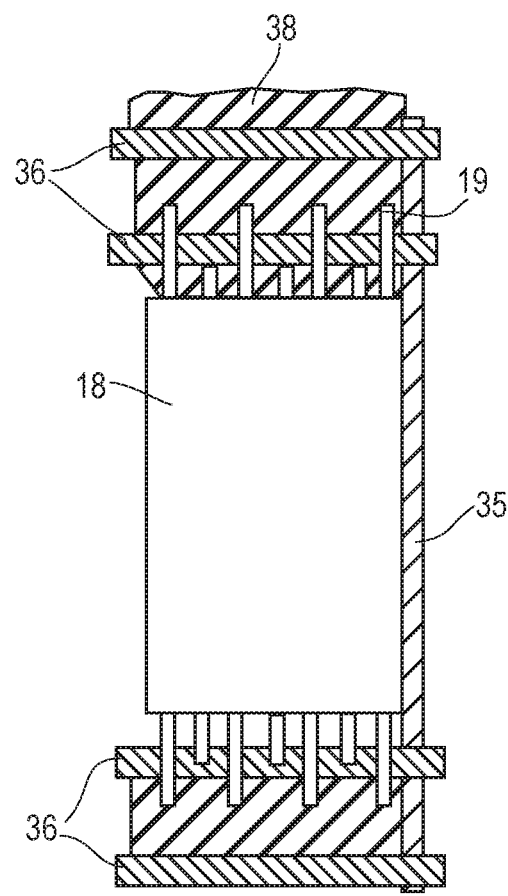
FIG. 3 depicts a metal mounting boss or other feature embedded in the wall of a container in accordance with exemplary embodiments.

Referring to FIG. 3, as noted above, additional structures may also be included, such as a fluid port 18, when applying the mold material 38. For added retention strength, the additional structure 18 may include laterally protruding members 19 (e.g., pins of multiple lengths).

Figure 4:
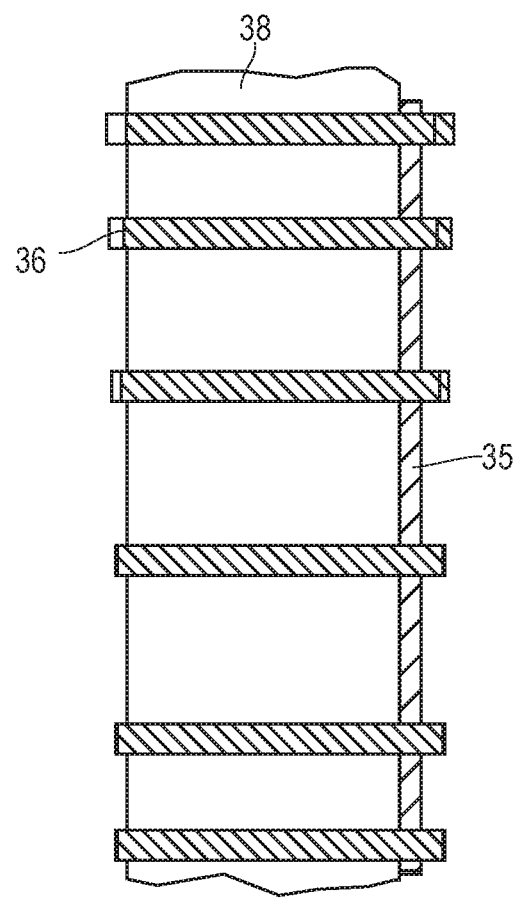
FIG. 4 depicts use of a pin grid array mounted on a sheet when producing a container in accordance with exemplary embodiments.

Referring to FIG. 4, after the mold material 38 has cured or hardened sufficiently, the backing material 35 may be removed. For example, the backing material 35 may be a backing sheet to which the pins 36 are secured via a weak adhesive, in which case the backing sheet 35 may be physically peeled away from the hardened mold material 38. Alternatively, the backing material 35 may be another material that can be removed by being dissolved with a solvent.

Figure 5:
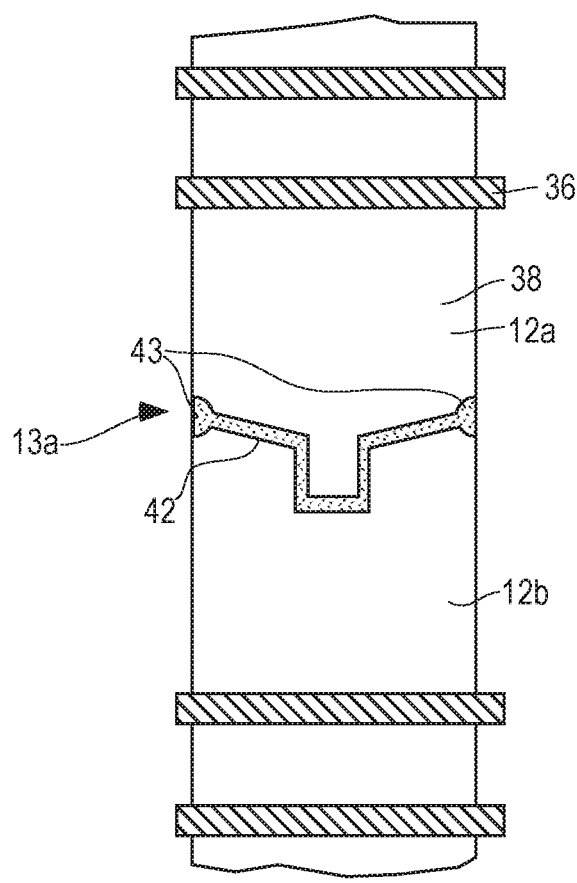
FIG. 5 depicts a joining of sections of a container when producing a container in accordance with exemplary embodiments.

Referring to FIG. 5, as noted above, adjoining container sections 12a, 12b may be joined at a joint 13a that may be of various forms, such as a tongue and groove joint for strength. An adhesive 42 may be used to bond the sections 12a, 12b for the final permanent assembly. Additionally, filler 43 may be inserted at the surfaces to ensure smooth transitions across the joint 13a along the inner and outer surfaces when the coating is applied (discussed in more detail below).

Figure 6:
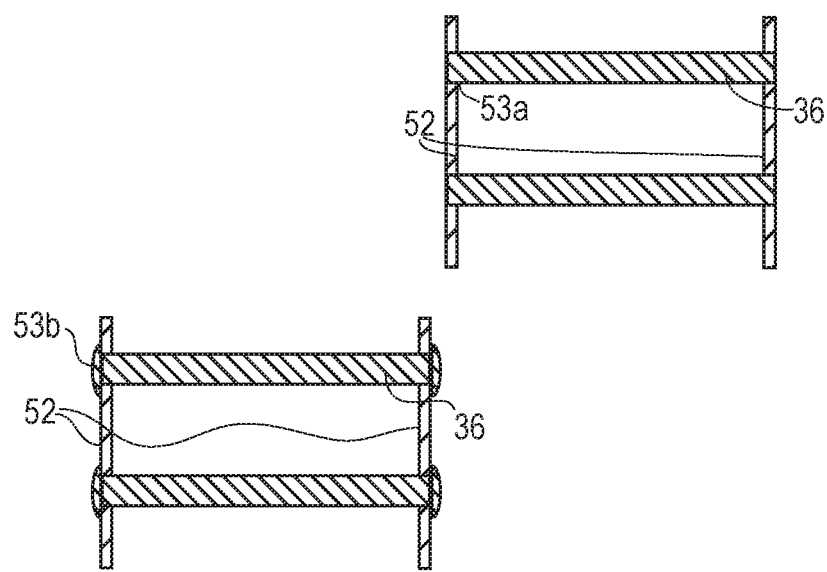
FIG. 6 depicts application of coatings to produce a container in accordance with exemplary embodiments.

Referring to FIG. 6, following assembly of the container sections 12a, 12b, 12c, 12d into a single unit 10 (or following sufficient hardening of the mold material 38 if the container 10 is produced in one piece), a metal coating 52 is applied to the inner and outer surfaces. As is well known to one of ordinary skill in the art, plastic components coated with metal have been found to exhibit enhanced structural strength, and even sometimes more structural strength than similar metal components, while also having less weight. As nanotechnology has advanced, it has been found that electrodeposited (plated) nanocrystalline metals offer superior strength characteristics when applied and bonded to the hardened mold material 38. (Among others, one example of such a nanocrystalline metal is "Nanovate™" produced by Integran Technologies.)

As this metal coating 52 is applied, it bonds with the metal pins. When the metal coating 52 is applied to be flush with the tips of the pins 36, such bonding takes place about the exposed periphery 53a of each pin. Alternatively, if the metal coating 52 is applied in such manner as to cover the tips of the pins 36, additional bonding may take place between the overlying coating 53b and tips of the pins 36. To ensure proper bonding of the metal pins 36 to the nanocrystalline metal, the exposed surfaces of the pins 36 may be prepared by blasting with an abrasive media (e.g., aluminum oxide) or chemical etching.

Figure 7:
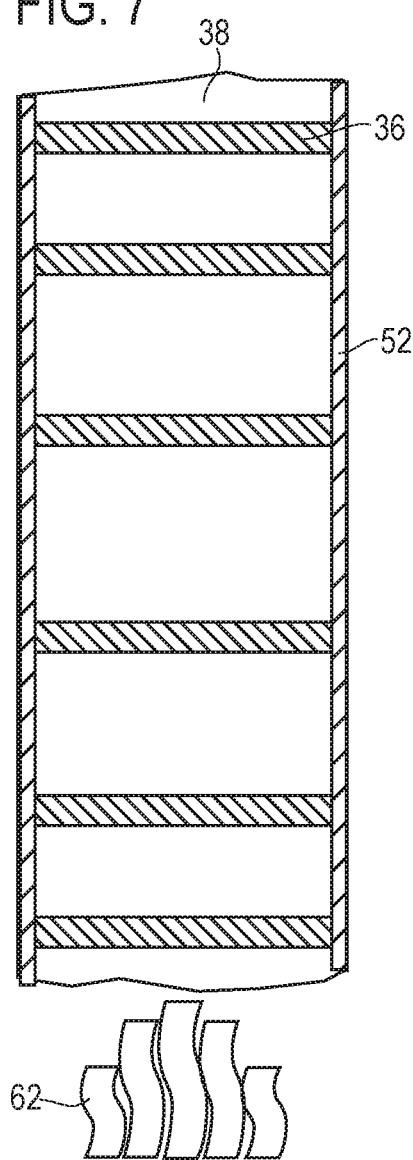
FIG. 7 depicts application of heat to melt away the net shape core when producing a container in accordance with exemplary embodiments.

Referring to FIG. 7, following application of the coating 52, a heat source 62 is applied to soften (e.g., melt) the mold material 38 (which will have a lower melting temperature than the metal pins 36 and coating 52), thereby facilitating its removal (e.g., via runoff of the molten material via openings left in the structure for this purpose). The resulting void between the inner and outer coating 52 layers and among the pins 36 may then be filled with another material 64 (FIG. 8), such as a fire-resistant foam, thereby endowing the resulting structure with high structural strength and fire resilience.

Figure 8:
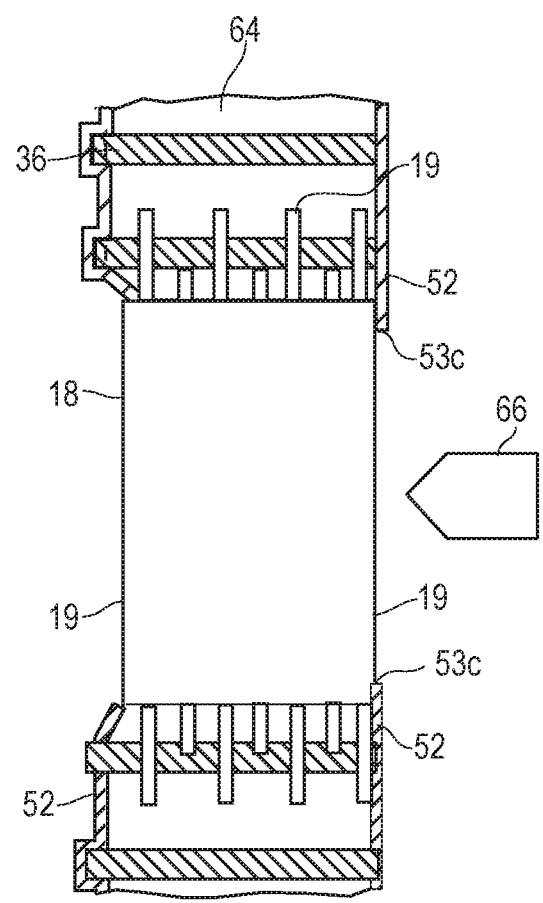
FIG. 8 depicts a portion of a resulting container structure including an embedded metal mounting boss or other feature in accordance with exemplary embodiments.

Referring to FIG. 8, in addition to bonding with the pins 36 (as discussed above), the metal coating 52 may also overlap and bond with edges 53c of the additional structural elements 18. (As will be readily appreciated by one of ordinary skill in the art, inner and outer surfaces 19 of such additional structural elements 18 may be masked during application of the coating 52.) Further, as needed, additional tooling 66 may be applied (e.g., drilling, tapping, grinding, etc.) to complete machining of the additional structural elements 18.

Referring to FIG. 9, in accordance with the foregoing discussion, a method 70 to produce a container in accordance with exemplary embodiments may begin with a step 72 of disposing multiple columnar members having mutually opposed ends, followed by a step 74 of applying, via an additive manufacturing process, a first material among the columnar members to form a shaped substrate having mutually opposed substrate surfaces at which the member ends are at least partially exposed. Next may be a step 76 of applying a coating of a second material to the substrate surfaces to form substrate coatings bonded to the member ends, after which may be a step 78 of removing the first material such that the substrate coatings remain in a mutually opposed disposition and define an interior region among the columnar members between the substrate coatings. A final step 80 may be filling the interior region with a third material, such as a fire-resistant foam.

Based upon the foregoing discussion, it will be appreciated that the disclosed embodiments offer numerous advantages, particularly in designing and manufacturing of aerospace engines where complex shapes and high strength-to-weight ratios for constituent components, such as oil tank structures, have become increasingly common requirements, as have needs for maintaining and improving upon available fire resiliency characteristics.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the disclosed embodiments (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A method for manufacturing at least a portion of a reinforced container, comprising:
   forming, with a first material via an additive manufacturing process, a shaped substrate having mutually opposed first and second substrate surfaces;
   disposing, within the substrate, a plurality of transverse members each of which includes mutually opposed first and second member ends exposed at least partially at the first and second substrate surfaces, respectively;
   applying a coating of a second material to the first and second substrate surfaces to form first and second substrate coatings bonded to the first and second member ends, respectively;
   removing substantially all of the first material such that the first and second substrate coatings remain in a mutually opposed disposition and define an interior region among the plurality of transverse members between the first and second substrate coatings; and
   filling substantially all of the interior region with a third material.

2. The method of claim 1, wherein:
   the first material has a first melting temperature;
   the second material has a second melting temperature;
   the first melting temperature is lower than the second melting temperature; and
   the removing substantially all of the first material comprises heating the first material to at least the first melting temperature.

3. The method of claim 1, wherein the filling substantially all of the interior region with a third material comprises introducing a fire-resistant foam material into the interior region.

4. The method of claim 1, wherein the plurality of transverse members comprises a grid array.

5. The method of claim 1, further comprising disposing, within the substrate, a fluid port including mutually opposed first and second port apertures exposed at least partially at the first and second substrate surfaces, respectively.

6. The method of claim 1, wherein the at least a portion of a reinforced container comprises at least a portion of a reinforced oil container.

7. A method for manufacturing at least a portion of a reinforced container, comprising:
   disposing a plurality of columnar members each of which includes mutually opposed first and second member ends;
   applying, via an additive manufacturing process, a first material among the plurality of columnar members to form a shaped substrate having mutually opposed first and second substrate surfaces at which the first and second member ends, respectively, are exposed at least partially;
   applying a coating of a second material to the first and second substrate surfaces to form first and second substrate coatings bonded to the first and second member ends, respectively;

removing substantially all of the first material such that the first and second substrate coatings remain in a mutually opposed disposition and define an interior region among the plurality of columnar members between the first and second substrate coatings; and filling substantially all of the interior region with a third material.

8. The method of claim 7, wherein:

the first material has a first melting temperature;

the second material has a second melting temperature;

the first melting temperature is lower than the second melting temperature; and the removing substantially all of the first material comprises heating the first material to at least the first melting temperature.

9. The method of claim 7, wherein the filling substantially all of the interior region with a third material comprises introducing a fire-resistant foam material into the interior region.

10. The method of claim 7, wherein the plurality of columnar members comprises a grid array.

11. The method of claim 7, wherein said disposing a plurality of columnar members comprises attaching the first end of each one of the plurality of columnar members to a support substrate.

12. The method of claim 7, wherein the attaching the first end of each one of the plurality of columnar members to a support substrate comprises attaching the first end of each one of the plurality of columnar members to a flexible sheet material.

13. The method of claim 7, following the applying, via an additive manufacturing process, a first material among the plurality of columnar members, further comprising detaching the support substrate from the first end of each one of the plurality of columnar members.

14. The method of claim 7, further comprising disposing a fluid port including mutually opposed first and second port apertures, wherein the applying, via an additive manufacturing process, a first material further comprises applying the first material about the fluid port such that the first and second port apertures are exposed at least partially at the first and second substrate surfaces, respectively.

15. The method of claim 7, wherein the at least a portion of a reinforced container comprises at least a portion of a reinforced oil container.

\* \* \* \* \*